(No Model.)
J. W. GIBBONEY.
SYSTEM OF POWER DISTRIBUTION AND REGULATION.
No. 524,381. Patented Aug. 14, 1894.
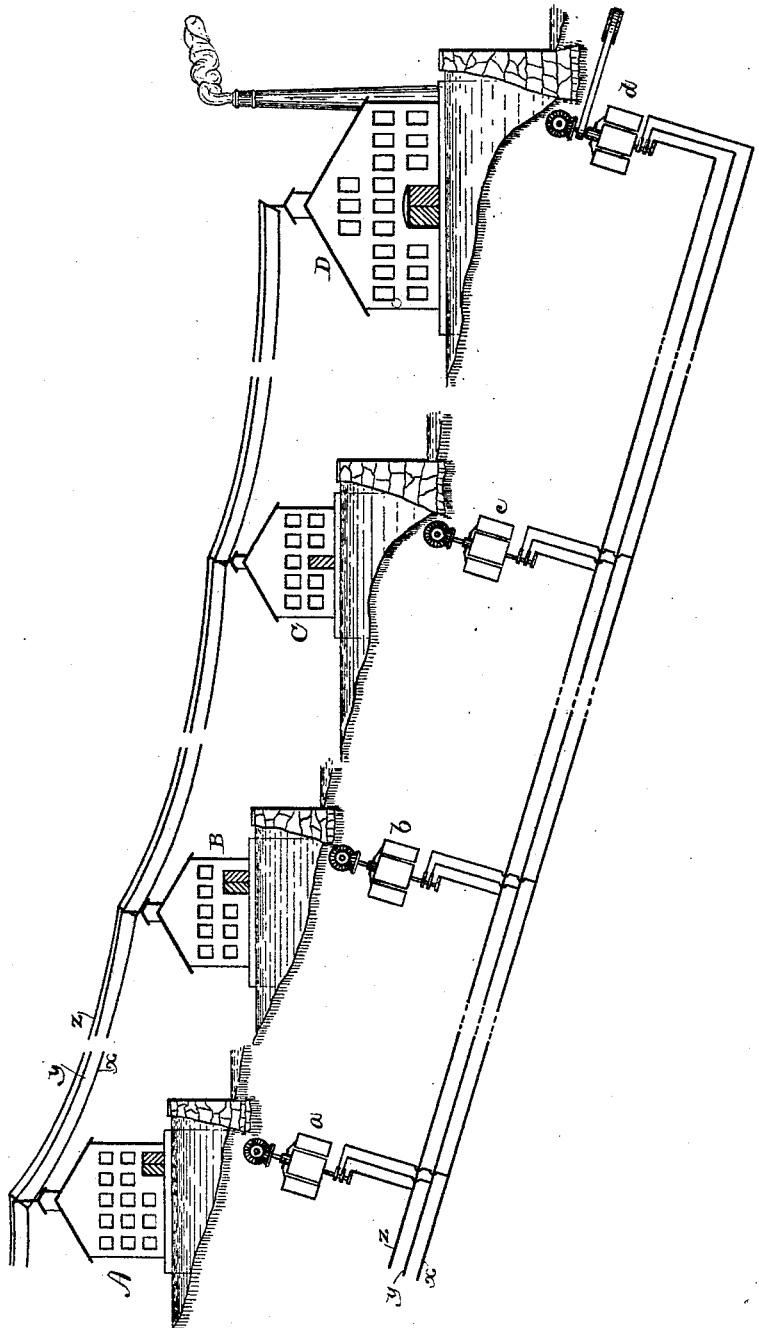
WITNESSES
Henry O. Westendarp
H. J. Livermore
INVENTOR
John W. Gibboney
By Bentley & Blodgett
Attys.

UNITED STATES PATENT OFFICE.

JOHN W. GIBBONEY, OF LYNN, ASSIGNOR TO THE GENERAL ELECTRIC COMPANY, OF BOSTON, MASSACHUSETTS.

SYSTEM OF POWER DISTRIBUTION AND REGULATION.

SPECIFICATION forming part of Letters Patent No. 524,381, dated August 14, 1894.

Application filed October 21, 1893. Serial No. 488,774. (No model.)

*To all whom it may concern:*

Be it known that I, JOHN W. GIBBONEY, a citizen of the United States, residing at Lynn, in the county of Essex and State of Massachusetts, have invented certain new and useful Improvements in Systems of Power Distribution and Regulation, of which the following is a specification.

My invention relates to a system of power distribution and regulation, and consists in installing in each of a number of mills, manufactories, or the like, a dynamo electric machine connected to a common circuit, which machine, in accordance with the conditions of load, becomes a generator delivering electric current to drive the other machines, or a motor receiving current from the other machines, whereby the mills or manufactories, so far as their power is concerned, are interdependent. By means of my invention there is obtained an equalization of load which tends to maintain the speed uniform and constant at all the mills connected by said common circuit. The size of the power plant moreover, which it is necessary to install for any of the said mills or factories is reduced because all of the power sources are called upon to deliver energy when a demand above the normal is made by one or more of the mills.

Furthermore, the invention is especially adapted for use in connection with a number of mills situated along a common stream. Suppose for example a stream, which may or may not be fed from a reservoir at its source, with a number of mills situated along the same. It is obvious in this case that the reservoir, or natural source of supply as the case may be, is called upon to furnish power sufficient to drive the largest mill on the stream, and the amount of water necessary to accomplish this end is of course in excess of the demand at the other mills, so that a certain proportion of the water escapes over the dams at these mills, and is not utilized. With the system embodying my invention in use, however, there is no such waste, for the extra supply of water which ordinarily escapes as above set forth, is turned to account in driving a dynamo-electric machine at the mills where the power would not otherwise be utilized. The current fed by such dynamo into the common circuit connecting the mills is thus received by the dynamo at the mill demanding the most power, and said dynamo becomes a motor assisting the water-power in driving the mill. The regulation thus afforded works both ways, so to speak, practically effecting a balance whereby the amount of water required to run the series of mills, instead of being the maximum required by the largest mill becomes practically a mean between such an amount and the maximum amount required by the smallest mill. Such regulation is moreover automatic since it is well known that if a number of dynamos are connected in parallel upon a common circuit, a drop in electro motive force of any of said dynamos will reverse the functions thereof, causing it to take current and run as a motor instead of as a generator.

While I have mentioned only the mills requiring extremes of power, it will be understood that the other mills in the system will give out or receive power according as their demand is above or below the mean demand of said system.

In the accompanying drawing, which is a diagrammatic representation of a series of mills provided with my system of power distribution and regulation, the mills A, B, C, D, are situated along the banks of a common stream, each mill having a dam for the utilization of water-power. The mill D is also provided with a steam plant as indicated in the drawing. The said mills are provided respectively with dynamo-electric machines $a$, $b$, $c$, $d$, which are here shown as multipolar machines of the three-phase type, all connected in parallel to a common three-phase circuit $x$, $y$, $z$. Of course it is not essential that the dynamo should be of the type shown, since any dynamo-electric machine capable of reversing its functions so as to act as a generator or a motor in accordance with the conditions of the circuit could be utilized. But it is manifestly of advantage to use synchronous alternating current machines, since the regulation for constant speed is thus rendered very close, and where the mills connected are some distance apart the saving of copper in the circuit is considerable. There is also a tendency toward more perfect regulation when, in addition to water-power, one or more of the mills is provided with a steam-engine as steam power is more sensitive and capable of much quicker regulation than water-power, and by my system of distribution regulation of any mill becomes universal throughout the system.

I do not intend to limit my invention to a series of mills or factories operated by water-power from one source, or from a number of sources, for the invention is applicable to any series or groups of mills situated near enough to one another to keep the cost of wiring from becoming excessive; and it matters not what kind of power is used or whence it is obtained. In any event an excess of power at any mill is taken up by any of the others which can utilize it, thereby obviating excessive waste, and at the same time insuring excellent regulation all through the system. It would also be within the bounds of my invention if there were but one mill or factory, situated at the most available position which can be found within a reasonable distance from the stream, preferably, of course, at the point where there is the best fall, so that a maximum amount of power can be directly utilized, or at a good shipping point, or place rendered desirable by other considerations, and to have in addition to this a number of electric generators installed at points along the stream connected to a common circuit leading to a motor or motors at the said mill. In this manner power may be picked up, as it were, at points where there would not be sufficient power to run a mill, or where for other reasons it would not be advantageous to directly utilize the power, and the aggregate from all these points fed to the motors at the mill so as to assist the power at that point. This is the same in principle as the system first described, the object of my invention being to provide means for utilizing the entire pressure of a body of water confined at suitable points in its course down stream, or more broadly for transferring an excess of power of any kind from a point where it cannot be utilized to a point where it can.

What I claim as new, and desire to secure by Letters Patent, is—

1. In a system of power distribution the combination with two or more independently operated plants, such as mills or factories, of a dynamo electric machine installed at each of said plants and adapted to cooperate therewith, and an electric circuit connecting said dynamo electric machines in parallel, as set forth.

2. A system of power distribution comprising two or more sources of power, plants normally operated by power from each of said sources, an electric circuit extending from one of said plants to the others, and dynamo-electric machines connected in parallel to said circuit and capable of reversing their functions as motor or generator in accordance with the condition of the load thereof, said dynamos being mechanically connected to said plants respectively and capable of being actuated thereby or assisting in the actuation thereof, substantially as described.

3. In combination with a series of plants independently operated by sources of variable power, the means of so distributing power throughout said series that an excess at any one plant supplies a deficiency at any other, said means consisting in a dynamo-electric machine installed at each of said plants capable of driving or assisting to drive the same or being driven thereby, and a common electric circuit connecting all of said dynamo-electric machines in parallel, as set forth.

4. A system of power distribution comprising a number of plants situated along a stream operated by pressure due to the fall of a body of water flowing by each in turn, an electric circuit connecting all of said plants, and means for distributing an excess of power at any of said plants among those where there is a deficiency of power, by converting said excess into an electric current adapted to be transmitted over said circuit to the desired plants and there reconverted, as set forth.

5. The means of distributing and equalizing power among a number of mills or factories situated along the bank of a common stream whence power is obtained for each, which consists in converting any excess of power at any of said mills into electrical energy, distributing said energy among the mills where there is a deficiency and there again converting it into power, as set forth.

6. A system of power distribution and regulation comprising a plurality of power plants, some of which are operated by power sources not susceptible to quick regulation to obtain constant speed under varying conditions of load, and another of which has a power source susceptible to quick regulation to maintain constant speed, dynamo machines at each of said plants connected to the machinery thereof, and capable of reversing their function so as to run either as generators or motors, and a common electrical circuit uniting said dynamos.

In witness whereof I have hereunto set my hand this 19th day of October, 1893.

JOHN W. GIBBONEY.

Witnesses:
BENJAMIN B. HULL,
WILLIAM D. POOL.